(12) United States Patent
Löcken et al.

(10) Patent No.: US 6,534,588 B1
(45) Date of Patent: Mar. 18, 2003

(54) COATING AGENT COMPRISED OF AT LEAST THREE CONSTITUENTS, METHOD FOR THE PRODUCTION THEREOF, AND ITS USE

(75) Inventors: Wilma Löcken, Haltern (DE); Heinz-Peter Rink, Münster (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/856,951

(22) PCT Filed: Nov. 18, 1999

(86) PCT No.: PCT/EP99/08855

§ 371 (c)(1),
(2), (4) Date: Jun. 22, 2001

(87) PCT Pub. No.: WO00/32667

PCT Pub. Date: Jun. 8, 2000

(30) Foreign Application Priority Data

Nov. 30, 1998 (DE) .......................................... 198 55 167

(51) Int. Cl.⁷ .............................. C08J 3/00; C08K 3/20; C08L 75/00; C08F 8/30; C08F 283/04

(52) U.S. Cl. ....................... 524/591; 524/507; 524/839; 524/840; 525/123; 525/127; 525/128; 525/455

(58) Field of Search ................................ 524/591, 839, 524/840, 507; 525/123, 128, 127, 455

(56) References Cited

FOREIGN PATENT DOCUMENTS

| DE | 196 18 446 A1 | 5/1996 | .......... C09D/175/04 |
|----|---------------|--------|----|
| EP | 0 409 301 A2 | 6/1990 | ............ C08G/18/32 |
| EP | 0 516 277 A1 | 4/1992 | ............ C08G/18/10 |
| EP | 0 530 806 A1 | 9/1992 | ............ C08G/18/38 |

Primary Examiner—Patrick D. Niland

(57) ABSTRACT

A coating composition consisting of at least three components, comprising a component (I) comprising at least one oligomeric or polymeric resin containing functional groups which react with isocyanate groups, as binder (A), a component (II) comprising at least one polyisocyanate as crosslinking agent (F), and a component (III) which consists of water or comprises water and at least one binder (A), wherein component (I) and/or (III) comprise or comprises at least one branched, cyclic and/or acyclic $C_9$–$C_{16}$-alkane which is functionalized using at least two hydroxyl groups.

38 Claims, No Drawings

COATING AGENT COMPRISED OF AT LEAST THREE CONSTITUENTS, METHOD FOR THE PRODUCTION THEREOF, AND ITS USE

The present invention relates to a coating composition consisting of at least three components comprising a component (I) comprising at least one oligomeric or polymeric resin containing functional groups which react with isocyanate groups, as binder (A), a component (II) comprising at least one poly-isocyante as crosslinking agent (F), and a component (III) which comprises water. The present invention additionally relates to a process for preparing these coating compositions and also to the use of the coating compositions in automotive OEM finishing, refinish, and for the coating of plastics, and also as topcoat materials or primer-surfacers.

Coating compositions of the abovementioned type are known from the German patents DE-A-195 42 626 and DE-A-44 21 823. These known coating compositions already have comparatively few surface problems, such as popping marks or structuring, and as regards gloss, relaxation, spraying reliability, fullness, weathering stability, and other important technological properties they possess a good profile of properties.

The increasingly more stringent requirements of the market, however are making it necessary to improve these known coating compositions still further in terms of their homogeneity, stability, handling, and popping limits. Moreover, the solvent content is to be lowered further than has been possible to date. Furthermore, the resulting coatings should have an even higher gasoline resistance and an even lower gray haze.

The invention accordingly provides the novel coating composition consisting of at least three components, comprising (I) a component comprising at least one oligomeric or polymeric resin containing functional groups which react with isocyanate groups, as binder (A), (II) a component comprising at least one polyisocyanate as crosslinking agent (F), and (II) a component which consists of water or comprises water and at least one binder (A), wherein component (I) and/or (III) comprise or comprises at least one branched cyclic and/or acyclic $C_9$–$C_{16}$-alkane which is functionalized using at least two hydroxyl groups.

In the text below the novel coating composition consisting of at least three components is referred to for the sake of brevity as the "coating composition of the invention".

The present invention further provides a process for preparing the coating compositions of the invention, and also provides for their use in automotive OEM finishing, refinishing, and the coating of plastics, as topcoat materials or primer-surfacers.

In the light of the prior art it was unforeseeable that the solution of the problem, with all of its advantages, might be achieved by means of the branched cyclic and/or acyclic $C_9$–$C_{16}$-alkanes for use in accordance with the invention, which are functionalized using at least two hydroxyl groups.

In the text below, the branched, cyclic and/or acyclic $C_9$–$C_{16}$ alkanes for use in accordance with the invention functionalized with at least two hydroxyl groups are referred to for the sake of brevity as "functionalized alkanes.

The coating compositions of the invention are notable, surprisingly, for a profile of properties which is improved over the prior art in relation in particular to the gloss, fullness, low popping tendency, spraying reliability and leveling, and also in respect of the weathering stability.

It is surprising, furthermore, that the coating compositions of the invention comprising said at least three components may be prepared simply by mixing without the need for complicated mixing and/or dispersing apparatus as described, for example, in the German patent DE-A-195 10 651. The coating compositions of the invention are therefore suitable in particular for the field of automotive refinish, since they can be prepared by the painter by simple mixing of the components prior to their application and can be cured at low temperatures.

A further advantage is that the coating compositions of the invention prepared from said at least three components contain only a small fraction of volatile organic solvents, despite the fact that the coating compositions are prepared using crosslinkers and binders dispersed and/or dissolved in organic media.

Moreover, the coating compositions of the invention ensure a high level of variability, since it is possible to use not only the crosslinking agents, pigments and additives that are recommended for aqueous coating compositions but also those used in conventional systems.

Finally, a feature of the inventive components of the coating compositions of the invention is a very good storage stability, which corresponds to that of conventional coating compositions.

The constituent of the coating compositions of the invention that is important to the invention comprises the functionalized alkanes. In accordance with the invention, they are present in components (I) and/or (III) described in detail below. If they are present in component (I), it is of advantage in accordance with the invention if they are present therein in an amount of from 1 to 80, preferably from 5 to 50 and in particular from 10 to 35% by weight, based in each case on the total amount of the functionalized alkanes and binders (A) described in detail below. If they are present in component (III), it is of advantage in accordance with the invention if they are present therein in an amount such that the abovementioned weight ratios result in the finished coating composition of the invention. It is of particular advantage in accordance with the invention if the functionalized alkanes are present predominantly or only in component (I).

The functionalized alkanes important to the invention are derived from branched, cyclic or acyclic alkanes having from 9 to 16 carbon atoms which in each case form the framework.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane and isopropylcyclohexane.

Examples of suitable alkanes of this kind having 10 carbon atoms are 4-ethyloctane, 2,3,4,5-tetramethylhexane, 2,3-dimethylhexane and 1-methyl-2-n-propylcyclohexane.

Examples of suitable alkanes of this kind having 11 carbon atoms are 2,4,5,6-tetramethylheptane or 3-methyl-6-ethyloctane.

Examples of suitable alkanes of this kind having 12 carbon atoms are 4-methyl-7-ethylnonane, 4,5-diethyloctane, 1'-ethylbutylcyclohexane, 3,5-diethyloctane and 2,4-diethyloctane.

Examples of suitable alkanes of this kind having 13 carbon atoms are 3,4-dimethyl-5-ethylnonane and 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane and 3,6-dimethyl-9-ethylundecane.

Examples of suitable alkanes of this kind having 16 carbon atoms are 3,7-diethyldodecane and 4-ethyl-6-isopropylundecane.

Of these frameworks, the alkanes having from 10 to 14 and in particular 12 carbon atoms are particularly advantageous and are therefore used with preference. Of these, the octane derivatives in turn are especially advantageous.

For the present invention it is of advantage if the functionalized alkanes which are derived from these branched, cyclic or acyclic alkanes as frameworks are liquid at room temperature. Accordingly it is preferred to use either individual liquid functionalized alkanes or liquid mixtures of these compounds. This is especially the case when functionalized alkanes are used which, owing to their high number of carbon atoms in the alkane framework, are solid as individual compounds. The skilled worker will therefore be able to select simply the corresponding functionalized alkanes.

For the invention it is advantageous if the functionalized alkanes have a boiling point of more than 200, preferably 220 and in particular 240° C. They should also have a lower evaporation rate For the coating compositions of the invention it is of advantage if the functionalized alkanes are acyclic.

The functionalized alkanes generally have primary and/or secondary hydroxyl groups. For the coating compositions of the invention it is of advantage if primary and/or secondary groups are present in one compound.

The functionalized alkanes accordingly comprise polyols. Particular advantages arise if they are diols and/or triols, but especially diols. These are used with very particular preference.

Especially advantageous coating compositions of the invention are obtained if the diols are positionally isomeric dialkyloctanediols, especially diethyloctanediols Outstanding results are achieved with 2,4-diethyl-1,5-octanediol.

The above-described functionalized alkanes are compounds which are known per so and may be prepared by means of customary and known synthesis methods of organic chemistry such as base-catalyzed aldol condensation, or obtained as byproducts of large-scale chemical syntheses such as the preparation of 2-ethylhexanol.

The further important constituent of component (I) of the coating composition of the invention is at least one oligomeric or polymeric resin containing functional groups which react with isocyanate groups, dispersed or dissolved in one or more organic, optionally water-dilutable solvents, as binder (A).

Examples of suitable functional groups for use in accordance with the invention that react with isocyanate groups are amino, thio and/or hydroxyl groups, of which the hydroxyl groups are particularly advantageous and are therefore particularly preferred in accordance with the invention.

Accordingly, the binders (A) which are preferred in accordance with the invention comprise hydroxyl-containing oligomeric or polymeric resins.

Examples of suitable binders (A) preferred in accordance with the invention are hydroxyl-containing linear and/or branched and/or block, comb and/or random poly(meth)acrylates, polyesters, alkyds, polyurethanes, acrylated polyurethanes, acrylated polyesters, polylactones, polycarbonates, polyethers, epoxy resin-amine adducts, (meth)acrylatediols, partially saponified polyvinyl esters or polyureas, of which the poly (meth)acrylate, the polyesters, the polyurethanes, the polyethers, and the epoxy resin-amine adducts are particularly advantageous and are therefore used with particular preference.

Regarding the preparability, the handling and the particularly advantageous properties of the coating compositions of the invention that are prepared using them, the poly (meth)acrylates, the polyesters and/or the polyurethanes afford very particular advantages, and so are used with very particular preference in accordance with the invention.

Besides the hydroxyl groups, these binders (A) may contain other functional groups as well, such as acryloyl, amide, imide, carbonate or epoxide groups.

In accordance with the invention it is further of advantage if at least one of the binders employed in each case in component (I), or all of the binders (A) employed in each case in component (I), are individually dispersible or soluble in water.

Examples of suitable water-soluble or water-dispersible binders contain alternatively (i) functional groups which can be converted into cations by neutralizing, agents and/or quaternizing agents, and/or cationic groups, or (ii) functional groups which can be converted into anions by neutralizing agents, and/or anionic groups, and/or (iii) nonionic hydrophilic groups.

Examples of suitable functional groups for use in accordance with the invention that be converted into cations by neutralizing agents and/or quaternizing agents are primary, secondary or tertiary amino groups, secondary sulfide groups or tertiary phosphine groups, especially tertiary amino groups or secondary sulfide groups.

Examples of suitable cationic groups for use in accordance with the invention are primary, secondary, tertiary or quaternary ammonium groups, tertiary sulfonium groups or quaternary phosphonium groups, preferably quaternary ammonium groups or tertiary sulfonium groups, but especially tertiary sulfonium groups.

Examples of suitable functional groups for use in accordance with the invention that may be converted into anions by neutralizing agents are carboxylic acid, sulfonic acid or phosphonic acid groups, especially carboxylic acid groups.

Examples of suitable anionic groups for use in accordance with the invention are carboxylate, sulfonate or phosphonate groups, especially carboxylate groups.

Examples of suitable nonionic hydrophilic groups for use in accordance with the invention are polyether groups, especially poly(alkylene ether) groups.

Regarding the preparability, handling and particularly advantageous properties of the coating compositions of the invention prepared using them, the binders (A) which contain the anion-forming groups and/or anions (ii), especially the carboxylic acid and/or the carboxylate groups, afford very particular advantages, and so are used with very particular preference in accordance with the invention.

Examples of very particularly preferred binders (A) of the last-mentioned type, for use in accordance with the invention, are (A1) acrylate copolymers (A1) which are dispersible or soluble in one or more organic, optionally water dilutable solvents, contain hydroxyl groups and carboxylic acid and/or carboxylate groups, and have a number average molecular weight Mn of between 1 000 and 30 000 daltons, an OH number of from 40 to 200 mg KOH/g, and an acid number of from 5 to 150 mg KOH/g, (A2) polyester resins (A2) which are dispersible or soluble in one or more organic, optionally water dilutable solvents, contain hydroxyl groups and carboxylic acid and/or carboxylate groups, and have a number average molecular weight Mn of between 1 000 and 30 000 daltons, an OH number of from 30 to 250 mg KOH/g, and an acid number of from 5 to 150 mg KOH/g, and/or (A3) polyurethane resins (A3) which are dispersible or soluble in one or more organic, optionally water dilutable solvents, contain hydroxyl groups and carboxylic acid and/or carboxylate groups, and have a number average molecular weight Mn of between 1 000 and 30 000 daltons, an OH number of from 20 to 200 mg KOH/g, and an acid number of from 5 to 150 mg KOH/g.

The binders (A1), (A2) and (A3) are present individually or as a mixture in component (I), and may further comprise at least one of the above-described binders (A), with the exception of those binders (A) which contain functional groups (i) that can be converted into cations by neutralizing agents and/or quaternizing agents, and/or cationic groups (i). In the text below, these binders (A) which may be used if desired with the binders (A1), (A2) and/or (A3) are referred to as binders (A4).

In accordance with the invention, the components (I) which contain the binders (A1), (A2) and/or (A3) and also, if desired, (A4) afford very particular advantages and are therefore used with very particular preference.

Similarly, the coating compositions of the invention which comprise this very particularly preferred component (I) afford very particular advantages and are therefore used with very particular preference.

If the mixing of the components (I), (II) and (III) is to take place by manual stirring, it is of advantage for the coating composition of the invention if the binders (A), especially the binders (A1), (A2), and/or (A3) and (A4), are selected such that their 50% strength solution of the binder (A) in ethoxyethyl propionate at 23° C. has a viscosity of <10 dpas. Where mechanical mixing is to take place, it is possible to use binders (A) of higher viscosity, whose 50% strength solution in ethoxyethyl propionate at 23° C. has a viscosity of ≦100 dPas. The viscosity is limited at the top end only by the performance capacity of the mixing equipment.

Suitable acrylate copolymers (A1) include all acrylate copolymers having the stated OH numbers, acid numbers, molecular weights, and viscosities.

In particular, use is made of acrylate copolymers (A1) obtainable by polymerizing in an organic solvent or solvent mixture and in the presence of at least one polymerization initiator, a1) a (meth)acrylic ester which is substantially free from acid groups and is different from but copolymerizable with (a2), (a3), (a4), (a5), and (a6), or a mixture of such monomers, a2) an ethylenically unsaturated monomer which carries at least one hydroxyl group per molecule and is substantially free from acid groups, and which is copolymerizable with (a1), (a3), (a4), (a5), and (a6) but different from (a5), or a mixture of such monomers, a3) an ethylenically unsaturated monomer which carries per molecule at least one acid group which can be converted into the corresponding acid anion group, and which is copolymerizable with (a1), (a2), (a4), (a5), and (a6); or a mixture of such monomers, and a4) if desired, one or more vinyl esters of alpha-branched monocarboxylic acids having from 5 to 18 carbon atoms per molecule, and/or a5) if desired, at least one reaction product of acrylic acid and/or methacrylic acid with the glycidyl ester of an alpha-branched monocarboxylic acid having from 5 to 18 carbon atoms per molecule, or instead of the reaction product an equivalent amount of acrylic and/or methacrylic acid which is then reacted during or after the polymerization reaction with the glycidyl ester of an alpha-branched monocarboxylic acid having from 5 to 18 carbon atoms per molecule, a6) if desired, an ethylenically unsaturated monomer which is substantially free from acid groups, is copolymerizable with (a1), (a2), (a3), (a4), and (a5) but different from (a1), (a2), (a4), and (a5); or a mixture of such monomers, in an organic solvent or solvent mixture and in the presence of at least one polymerization initiator, the nature and amount of (a1), (a2), (a3), (a4), (d5), and (a6) being selected so that the polyacrylate. resin (A1) has the desired OH number, acid number, and molecular weight.

To prepare the polyacrylate resins used in accordance with the invention it is possible as component (a1) to use any (meth)acrylic alkyl or cycloalkyl ester which is copolymerizable with (a2), (a3), (a4), (a5), and (a6) and which has up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl esters or oxacycloalkyl esters such as ethyl triglycol (meth)acrylate and methoxyoligoglycol (meth)acrylate having a molecular weight Mn of preferably 550; or other ethoxylated and/or propoxylated, hydroxyl-free (meth)acrylic acid derivatives. There may contain minor amounts of (meth)acrylic alkyl or cycloalkyl esters of higher functionality, such as ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol di(meth)acrylate; trimethylolpropane di- or tri(meth)acrylate; or pentaerythritol di-, tri- or tetra (meth) acrylate. In the context of the present invention, minor amounts of monomers of relatively high functionality are understood as being amounts which do not lead to crosslinking or gelling of the polyacrylate resins.

As component (a2) it is possible to use ethylenically unsaturated monomers which carry at least one hydroxyl group per molecule and are substantially free from acid groups, and are copolymerizable with (a1), (a3), (a4), (a5), and (a6) but different from (a5), such as hydroxyalkyl esters of acrylic acid, methacrylic acid or another alpha, beta-ethylenically unsaturated carboxylic acid which are derived from an alkylene glycol which is esterified with the acid or are obtainable by reacting the acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; 1,4-bis (hydroxymethyl)cyclohexane, octahydro-4,7-methano-1H-indenedimethanol, or methylpropanediol monoacrylate, monomethacrylate, monoethacrylate, monocrotonate, monomaleate, monofumarate or monoitaconate; or reaction products of these hydroxyalkyl esters and cyclic esters, such as epsilon-caprolactone, for example; or olefinically unsaturated alcohols such as allyl alcohol or polyols such as trimethylolpropane monoallyl or diallyl ether or pentaerythritol monoallyl, diallyl or triallyl ether. Regarding these monomers (a2) of higher functionality, the comments made regarding the higher-functional monomers (a1) apply analogously. The fraction of trimethylolpropane monoallyl ether is usually from 2 to 10% by weight, based on the overall weight of the monomers (a1) to (a6) used to prepare the polyacrylate resin. In addition, however, it is also possible to add from 2 to 10% by weight, based on the overall weight of the monomers used to prepare the polyacrylate resin, of trimethylolpropane monoallyl ether to the finished polyacrylate resin. The olefinic unsaturated polyols, such as trimethylolpropane monoallyl ether in particular, may be used as sole hydroxyl-containing monomers, but in particular may also be used proportionally in combination with other of the hydroxyl-containing monomers mentioned.

As Component (a3), it is possible to use any ethylenically unsaturated monomer which carries at least one acid group, preferably a carboxyl group, per molecule and is copolymerizable with (a1), (a2), (a4), (a5), and (a6); or a mixture of such monomers. Acrylic acid and/or methacrylic acid are used with particular preference as component (a3). It is, however, also possible to use other ethylenically unsaturated carboxylic acids having up to 6 carbon atoms in the molecule. Examples of such acids are ethacrylic acid, crotonic acid, maleic acid, fumaric acid, and itaconic acid. A further possibility is to use ethylenically unsaturated sulfonic or phosphonic acids, and/or their partial esters, as component (a3). Further suitable components (a3) include mono(meth)acryloyloxyethyl maleate, succinate, and phthalate.

As component (a4) use is made of one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may contain both branched and straight-chain acylic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be prepared conventionally from the acids, by reacting the acid with acetylene, for example. Particular preference is given— owing to their ready availability—to using vinyl esters of saturated aliphatic monocarboxylic acids having 9 to 11 carbon atoms that are branched on the alpha carbon atom.

As component (a5), the reaction product of acrylic acid and/or methacrylic acid with the glycidyl ester of an alpha-branched monocarboxylic acid having from 5 to 18 carbon atoms per molecule is used. Glycidyl esters of highly branched monocarboxylic acids are available under the tradename Cardura. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name Cardura E10.

As component (a6) it is possible to use all ethylenically unsaturated monomers that are substantially free from acid groups and are copolymerizable with (a1), (a2), (a3), (a4), and (a5) but different from (a1), (a2), (a3), and (a4); or mixtures of such monomers. Suitable components (a6) include olefins, such as ethylene, propylene, 1-butene, 1-pentene, 1-hexene, cyclohexene, cyclopentene, norbornene, butadiene, isoprene, cyclopentadiene and/or dicyclopentadiene;

(meth)acrylamides such as (meth)acrylamide, N-methyl-, N,X-dimethyl-, N-ethyl-, N,N-diethyl-, N-propyl-, N,N-dipropyl, N-butyl-, N,N-dibutyl-, N-cyclohexyl- and/or N,N-cyclohexylmethyl-(meth)acrylamide;

monomers containing epoxide groups, such as the glycidyl ester of acrylic acid, methacrylic acid, ethacrylic acid, crotonic acid, maleic acid, fumaric acid and/or itaconic acid;

vinylaromatic hydrocarbons, such as styrene, alpha-alkyletyrenes, especially alpha-methyl-styrene, and/or vinyltoluene;

nitriles such as acrylonitrile and/or methacrylonitrile;

vinyl compounds such as vinyl chloride, vinyl fluoride, vinylidene dichloride, vinylidene difluoride; N-vinylpyrrolidone; vinyl ethers such as ethyl vinyl other, n-propyl vinyl ether, isopropyl vinyl ether, n-butyl vinyl ether, isobutyl vinyl ether and/or vinyl cyclohexyl ether; vinyl esters such as vinyl acetate, vinyl propionate, vinyl butyrate, vinyl pivalate and or the vinyl ester of 2-methyl-2-ethylheptanoic acid; and/or polysiloxane macromonomers which have a number average molecular weight Mn of from 1 000 to 40 000, preferably from 2 000 to 20 000, with particular preference from 2 500 to 10 000, and in particular from 3 000 to 7 000, and contain on average from 0.5 to 2.5, preferably from 0.5 to 1.5, ethylenically unsaturated double bonds per molecule, as described in DE-A 38 07 571 on pages 5 to 7, in DE-A 37 06 095 in columns 3 to 7, in EP-B-0 358 153 on pages 3 to 6, in U.S. Pat. No. 4,754,014 in columns 5 to 9, in DE-A 44 21 823, or in the international patent application WO 92/22615 on page 12, line 18 to page 18, line 10, or acryloxysilane-containing vinyl monomers, preparable by reacting hydroxy-functional silanes with epichlorohydrin and then reacting that reaction product with methacrylic acid and/or hydroxyalkyl esters of (meth)acrylic acid.

It is preferred to use vinylaromatic hydrocarbons.

It is of advantage to use the polysiloxane macromonomers a6) together with other monomers (a6). In this case the amount of the polysiloxane macromonomer or macromonomers (a6) f or modifying the acrylate copolymers (A1) should be less than 5% by weight, preferably from 0.05 to 2.5% by weight, with particular preference from 0.05 to 0.8% by weight, based in each case on the overall weight of the monomers used to prepare the copolymer (A1). The use of such polysiloxane macromonomers leads to an improvement in the slip of the coatings of the invention.

The nature and amount of components (a1) to (a6) is selected such that the polyacrylate resin (A1) has the desired OH number, acid number, and glass transition temperature. Acrylate resins used with particular preference are obtained by polymerizing (a1) from 20 to 60% by weight, preferably from 30 to 50% by weight, of component (a1), (a2) from 10 to 50% by weight, preferably from 15 to 40% by weight, of component (a2), (a3) from 1 to 15% by weight, preferably from 1 to 8% by weight of component (a3), (a4) from 0 to 25% by weight, preferably from 5 to 15% by weight of component (a4), (a5) from 0 to 25% by weight, preferably from 5 to 15% by weight, of component (a5), and (a6) from 5 to 30% by weight, preferably from 10 to 20% by weight, of component (a6), the sum of the weight fractions of components (a1) to (a6) being in each case 100% by weight.

The polyacrylate resins (A1) used in accordance with the invention are prepared in an organic solvent or solvent mixture and in the presence of at least one polymerization initiator. Organic solvents and polymerization initiators used are the solvents and polymerization initiators which are customary for the preparation of polyacrylate resins and suitable for the preparation of aqueous dispersions. The solvents may participate in the reaction with the crosslinking component (II) and may therefore act as reactive diluents.

Examples of suitable reactive diluents are the functionalized alkanes.

Further examples of suitable reactive diluents are oligomeric polyols obtainable by hydroformylation and subsequent hydrogenation of oligomeric intermediates themselves obtained by metathesis reactions of acyclic monoolefins and cyclic monoolefins; examples of suitable cyclic monoolefins are cyclobutene, cyclo-pentene, cyclohexene, cyclooctene, cycloheptene, norbornene, and 7-oxanorbornene; examples of suitable acyclic monoolefins are contained in hydrocarbon mixtures obtained in petroleum processing by cracking ($C_5$ cut); examples of suitable oligomeric polyols for use in accordance with the invention have a hydroxyl number (OHN) of from 200 to 450, a number average molecular weight Mn of from 400 to 1 000, and a mass average molecular weight Mw from 600 to 1100;

Further examples of suitable reactive diluents are hyperbranched compounds having a tetrafunctional central group, derived from ditrimethylolpropane, diglycerol, ditrimethylolethane, pentaerythritol, tetrakis(2-hydroxyethyl)methane, tetrakis(3-hydroxypropyl)methane or 2,2-bishydroxymethyl-1,4-butanediol (homopentaerythritol). These reactive diluents may be prepared by the customary and known methods of preparing hyperbranched and dendrimeric compounds. Suitable synthesis methods are described, for example, in the patents WO 93/17060 and WO 96/12754 or in the book by G. R. Newkome, C. N. Moorefield and F. Vögtle, "Dendritic Molecules, Concepts, Syntheses, Perspectives", VCH, Weinheim, N.Y., 1996.

Further examples of suitable reactive diluents are polycarbonatediols, polyestarpolyols, poly(meth)-acrylatediols or hydroxyl-containing polyaddition products.

Examples of suitable isocyanate-reactive solvents which may be regarded as monofunctional reactive diluents are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethylene ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, isopropoxypropanol or methoxypropyl acetate.

Said reactive diluents, especially the functionalized alkanes, and/or the isocyanate-reactive solvents may also be present in component (III).

It is also possible in this context first to prepare the polyacrylate resins (A1) in a solvent which is not water dilutable and following the polymerization to replace some or all of this solvent by water dilutable solvent.

Examples of suitable polymerization initiators are initiators which form free radicals, such as tert-butyl peroxyethylhexanoate, benzoyl peroxide, di-tert-amyl peroxide, azobisisobutyronitrile, and tert-butyl perbenzoate, for example. The initiators are used preferably in an amount from 1 to 25% by weight, with particular preference from 2 to 10% by weight, based on the overall weight of the monomers.

The polymerization is appropriately conducted at a temperature from 80 to 200° C., preferably from 110 to 180° C. Preferred solvents used are ethoxyethyl propionate sad isopropoxypropanol.

The polyacrylate resin (A1) is preferably prepared by a two-stage process, since in that way the resultant coating compositions of the invention possess better processing properties. It is therefore preferred to use polyacrylate resins which are obtainable by 1. polymerizing a mixture of (a1), (a2), (a4), (a5), and (a6), or a mixture of portions of components (a1), (a2), (a4), (a5), and (a6), in an organic solvent and/or in one of the abovementioned reactive diluents,
2. after at least 60% by weight of the mixture consisting of (a1), (a2), (a4), (a5), and, where used (a6) have been added, adding (a3) and any remainder of components (a1), (a2), (a4), (a5), and (a6), and continuing polymerization, and
3. after the end of the polymerization, subjecting the resulting polyacrylate resin if desired to at least partial neutralization, i.e., converting the acid groups into the corresponding acid anion groups.

In addition, however, it is also possible to include components (a4) and/or (a5) in the initial charge together with at least part of the solvent, and to meter in the remaining components. Moreover, it is also possible for components (a4) and/or (a5) to be included only in part in the initial charge, together with at least part of the solvent, and for the remainder of these components to be added as described above. Preferably, for example, at least 20% by weight of the solvent and about 10% by weight of component (a4) and (a5), and also, if desired, portions of components (a1) and (a6), are included in the initial charge.

Preference is also given to preparing the polyacrylate resins (A1) used in accordance with the invention by means of a two-stage process whose first stage lasts from 1 to 8 hours, preferably from 1.5 to 4 hours, and a mixture of (a3) and any remainder of components (a1), (a2), (a4), (a5), and (a6) is added over the course of from 20 to 120 minutes, preferably over the course of from 30 to 90 minutes. Following the end of the addition of the mixture of (a3) and any remainder of components (a1), (a2), (a4), (a5), and (a6), polymerization is continued until all of the monomers used have undergone substantially complete reaction. The second stage in this process may immediately follow the first. Alternatively, the second stage may be commenced after a certain time, for example after from 10 minutes to 10 hours.

The amount and rate of addition of the initiator are preferably chosen so as to give a polyacrylate resin (A1) having a number average molecular weight Mn of from 1 000 to 30 000 daltons. It is preferred to commence the initiator feed at a certain time, generally about 15 minutes, before the feeding of the monomers. Preference is given, further, to a process in which the addition of initiator is commenced at the same point in time as the addition of the monomers and is ended about half an hour after the addition of the monomers has ended. The initiator is preferably added in a constant amount per unit time. Following the end of the addition initiator, the reaction mixture is held at polymerization temperature until (generally 1.5 hours) all of the monomers used have undergone substantially complete reaction. Substantially complete reaction" is intended to denote that preferably 100% by weight of the monomers used have undergone reaction but that it is also possible for a small residual monomer content of not more than up to about 0.5% by weight, based on the weight of the reaction mixture, to remain unreacted.

Preferably, the monomers for preparing the polyacrylate resins (A1) are polymerized at a polymerization solids which is not too high, preferably at a polymerization solids of from 80 to 50% by weight, based on the comonomers, and then the solvents are removed in part by distillation, so that the resulting polyacrylate resin solutions (A1) have a solids content of preferably from 100 to 60% by weight.

The preparation of the polyacrylate resins (A1) for use in accordance with the invention has no special features in terms of its methodology but instead takes place by means of the methods of continuous or batchwise copolymerization that are known and customary in the polymers field, under atmospheric pressure or superatmospheric pressure, in stirred tanks, autoclaves, tube reactors or Taylor reactors.

Examples of suitable (co)polymerization processes are described in the patents DE-A-197 09 465, DE-C-197 09 476, DE-A-28 48 906, DE-A-195 24 182, EP-A-0 554 783, WO 95/27742 or WO 82/02387.

In accordance with the invention, Taylor reactors are advantageous and are therefore used with preference for the process of the invention.

Taylor reactors, which serve to convert substances under the conditions of Taylor flow, are known. They consist substantially of two coaxial concentric cylinders of which the outer is fixed and the inner rotates. The reaction space is the volume formed by the gap between the cylinders. Increasing angular velocity $\omega_i$ of the inner cylinder is accompanied by a series of different flow patterns which are characterized by a dimensionless parameter, known as the Taylor number Ta. In addition to the angular velocity of the stirrer, the Taylor number is also dependent on the kinematic viscosity $\nu$ of the fluid in the gap and on the geometric parameters, the external radius of the inner cylinder $r_i$, the internal radius of the outer cylinder $r_o$, and the gap width d, the difference between the two radii, in accordance with the following formula:

$$Ta = \omega_i r_i d \, \nu^{-1} (d/r_i)^{1/2} \quad (I)$$

where $d = r_o - r_i$.

At low angular viscosity, the laminar Couette flow, a simple shear flow, develops. If the rotary speed of the inner cylinder is increased further, then, above a critical level, alternately contrarotating vortices (rotating in opposition) occur, with axes along the peripheral direction. These vortices, called Taylor vortices, are rotationally symmetric and have a diameter which is approximately the same size as the gap width. Two adjacent vortices form a vortex pair or vortex cell.

The basis for this behavior is the fact that, in the course of rotation of the inner cylinder with the outer cylinder at rest, the fluid particles that are near to the inner cylinder are subject to a greater centrifugal force than those at a greater distance from the inner cylinder. This difference in the acting centrifugal forces displaces the fluid particles from the inner to the outer cylinder. The centrifugal force acts counter to the viscosity force, since for the motion of the fluid particles it is necessary to overcome the friction. Any increase in the rotary speed is accompanied by an increase in the centrifugal force as well. The Taylor vortices are formed when the centrifugal force exceeds the stabilizing viscosity force.

In the case of Taylor flow with a low axial flow, each vortex pair passes through the gap, with only a low level of mass transfer between adjacent vortex pairs. Mixing within such vortex pairs is very high, whereas axial mixing beyond the pair boundaries is very low. A vortex pair may therefore be regarded as a stirred tank in which there is thorough mixing. Accordingly, the flow system behaves as an ideal flow tube in that the vortex pairs pass through the gap with constant residence time, like ideal stirred tanks.

An advantage in accordance with the invention here are Taylor reactors having an external reactor wall located within which there is a concentrically or eccentrically disposed rotor, a reactor floor, and a reactor lid, which together define the annular reactor volume, at least one means for metered addition of reactants, and a means for the discharge of product, where the reactor wall and/or the rotor are or is geometrically designed in such a way that the conditions for Taylor flow are met over substantially the entire reactor length in the reactor volume, i.e., in such a way that the annular gap broadens in the direction of flow traversal.

Suitable polyesters (A2) include all polyesters having the above-indicated OH numbers, acid numbers, molecular weights, and viscosities.

Use is made in particular of polyesters (A2) obtainable by reacting p1) optionally sulfonated polycarboxylic acids or their eterifiable derivatives, together if desired width monocarboxylic acids, p2) polyols, together if desired with monools, p3) if desired, further modifying components, and p4) if desired, a component which is reactive with the reaction product of (p1), (p2) and, where used, (p3).

Examples that may be given of polycarboxylic acids that may be used as component (p1) are aromatic, aliphatic, and cycloaliphatic polycarboxylic acids. As component (p1) it is preferred to use aromatic and/or aliphatic polycarboxylic acids.

Examples of suitable polycarboxylic acids are phthalic acid, isophthalic acid, terephthalic acid, phthalic, isophthalic or terephthalic monosulfonate, halophthalic acids, such as tetrachlorophthalic or tetrabromophthalic acid, adipic acid, glutaric acid, azelaic acid, sebacic acid, fumaric acid, maleic acid, trimellitic acid, pyromellitic acid, tetrahydrophthalic acid, hexahydrophthalic acid, 1,2-cyclohexanedicarboxylic acid, 1,3-cyclohexanedicarboxylic acid, 1,4-cyclohexanedicarboxylic acid, 4-methylhexahydrophthalic acid, endomethylenetetrahydrophthalic acid, tricyclodecanedicarboxylic acid, endoethylenehexahydrophthalic acid, camphoric acid, cyclohexanetetracarboxylic acid, or cyclobutanetetracarboxylic acid. The cycloaliphatic polycarboxylic acids may be used either in their cis or in their trans form or as a mixture of both forms. Also suitable are the esterifiable derivatives of the aforementioned polycarboxylic acids, such as their monoesters or polyesters with aliphatic alcohols having from 1 to 4 carbon atoms or hydroxy alcohols having from 1 to 4 carbon atoms, for example. It is also possible to use the anhydrides of the abovementioned acids, where they exist.

If desired, together with the polycarboxylic acids it is also possible to use monocarboxylic acids, such as benzoic acid, tert-butylbenzoic acid, lauric acid, isononanoic acid, and fatty acids of naturally occurring oils, for example. Isononanoic acid is a preferred monocarboxylic acid used.

Suitable alcohol components (p2) for preparing the polyester (A2) are polyhydric alcohols, such as ethylene glycol, propanediols, butanediols, hexanediols, neopentyl hydroxypivalate, neopentyl glycol, diethylene glycol, cyclohexanediol, cyclohexanedimethanol, trimethylpentanediol, ethylbutylpropanediol, ditrimethylolpropane, trimethylolethane, trimethylolpropane, glycerol, pentaerythritol, dipentaerythritol, trishydroxyethyl izocyanate, polyethylene glycol, polypropylene glycol, alone or together with monohydric alcohols, such as butanol, octanol, lauryl alcohol, cyclohexanol, tert-butylcyclohexanol, ethoxylated and/or propoxylated phenols, for example.

Compounds suitable as component (p3) for preparing the polyesters (A2) include in particular those having a group which is reactive toward the functional groups of the polyester, with the exception of the compounds specified as component (p4). As modifying component (p3) it is preferred to use polyisocyanates and/or diepoxide compounds, and also, if desired, monoisocyanates and/or monoepoxide compounds. Suitable components (p3) are described, for example, in DE-A-40 24 204 on page 4, lines 4 to 9.

Compounds suitable as component (p4) for preparing the polyesters (A2) are those compounds which in addition to a group that is reactive toward the functional groups of the polyester (A2) also contain a tertiary amino group, examples including monoisocyanates containing at least one tertiary amino group, or mercapto compounds containing at least one tertiary amino group. For details, refer to DE-A-40 24 204, page 4, lines 10 to 49.

The polyesters (A2) are prepared in accordance with the known methods of esterification, as is described, for example, in DE-A-40 24 204, page 4, lines 50 to 65. This reaction takes place usually at temperatures between 180 and 280° C., in the absence or presence of an appropriate esterification catalyst, such as lithium octoate, dibutyltin oxide, dibutyltin dilaurate or para-toluenesulfonic acid, for example.

The polyesters (A2) are normally prepared in the presence of small amounts of an appropriate solvent as entrainer. Examples of entrainers used include aromatic hydrocarbons, such as xylene in particular, and (cyclo)aliphatic hydrocarbons, e.g. cyclohexane or methylcyclohexane.

As component (A2) it is particularly preferred to use polyesters which have been prepared by a two-stage process, by first preparing a hydroxyl-containing polyester having an OH number of from 100 to 300 mg KOH/g, an acid number of less than 10 mg KOH/g, and a number average molecular weight Mn of from 500 to 2 000 daltons, which is then reacted in a second stage with carboxylic anhydrides to give the desired polyester (A2). The amount of carboxylic anhydrides in this case is chosen so that the resulting polyester has the desired acid number. Acid anhydrides suitable for this reaction are all those commonly used, such as hexahydrophthalic anhydride, trimellitic anhydride, pyromellitic anhydride, phthalic anhydride, camphoric anhydride, tetrahydrophthalic anhydride, succinic anhydride, and mixtures of these and/or other anhydrides, and especially anhydrides of aromatic polycarboxylic acids, such as trimellitic anhydride, for example.

It is possible if desired for the polyacrylate resin (A1) to have been prepared at least in part in the presence of polyesters (A2). In this case, advantageously at least 20% by weight and with particular advantage from 40 to 80% by weight of the component (A1) are prepared in the presence of the component (A2).

Any remainder of the component (A1) is added subsequently to the binder solution. In this case it is possible for this already polymerized resin to have the same monomer composition as the polyacrylate resin synthesized in the presence of the polyester. Alternatively, a hydroxyl-containing polyacrylate resin having a different monomer composition may be added, Also possible is the addition of a mixture of different polyacrylate resins and/or polyesters, with possibly one resin having the same monomer composition as the polyacrylate resin synthesized in the presence of the polyester.

As the polyurethane resin (A3) for use in accordance with the invention, containing hydroxyl and acid groups, suitable resins include all polyurethane resins having the indicated OH numbers, acid numbers, molecular weights, and viscosities.

Suitable polyurethane resins (A3) are described, for example, in the following documents: EP-A-355 433, DE-A-35 45 618, DE-A-38 13 866, DE-A-32 10 051, DE-A-26 24 442, DE-A-37 39 332, U.S. Pat. No. 4,719,132, EP-A-89 497, U.S. Pat. Nos. 4,558,090, 4,489,135, DE-A-36 28 124, EP-A-158 099, DE-A-29 26 584, EP-A-195 931, DE-A-33 21 180 and DE-A-40 05 961.

In component (I) it is preferred to use polyurethane resins which are preparable by reacting isocyanato-containing prepolymers with compounds that are reactive toward isocyanate groups.

The preparation of isocyanato-containing prepolymers may take place by reacting polyols having a hydroxyl number of from 10 to 1 800, preferably from 50 to 1 200 mg KOH/g with excess polyisocyanates at temperatures or up to 150° C., preferably from 50 to 130° C., in organic solvents which are unable to react with isocyanates. The equivalents ratio of NCO to OH groups is situated between 2.0:1.0 and >1.0:1.0, preferably between 1.4:1 and 1.1:1.

The polyols used to prepare the prepolymer may be of low molecular weight and/or high molecular weight and may contain groups that are slow to react and are anionic or capable of forming anions. It is also possible to use low molecular weight polyols having a molecular weight of from 60 up to 400 daltons to prepare the isocyanato-containing prepolymers. In this case amounts of up to 30% by weight of the overall polyol constituents are used, preferably from about 2 to 20% by weight.

In order to obtain an NCO prepolymer of high flexibility, a high fraction of a predominantly linear polyol having a preferred OH number of from 30 to 150 mg KOH/g should be added. Up to 97% by weight of the overall polyol may consist of saturated and unsaturated polyesters and/or polyethers having a number average molecular weight Mn of from 400 to 5 000 daltons. The selected polyetherdiols should not introduce excessive amounts of ether groups, since otherwise the polymers formed start to swell in water. Polyesterdiols are prepared by esterifying organic dicarboxylic acids or their anhydrides with organic diols, or derive from a hydroxycarboxylic acid or from a lactone. In order to prepare branched polyester polyols, it is possible to employ a minor proportion of polyols or polycarboxylic acids having a higher functionality.

The alcohol component used to prepare the polyurethane resins preferably consists at least to a certain extent of $u_1$) at least one diol of the formula (I')

in which $R_1$ and $R_2$ are each an identical or different radical and are an alkyl radical having from 1 to 18 carbon atoms, an aryl radical or a cycloaliphatic radical, with the proviso that $R_1$ and/or $R_2$ must not be methyl, and/or $u_2$) at least one diol of the formula (II')

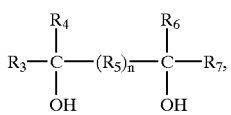

(II')

in which $R_3$, $R_4$, $R_6$ and $R_7$ are each identical or different radicals and are an alkyl radical having from 1 to 6 carbon atoms, a cycloalkyl radical or an aryl radical and $R_5$ is an alkyl radical having from 1 to 6 carbon atoms, an aryl radical or an unsaturated alkyl radical having from 1 to 6 carbon atoms, and n is eiter 0 or 1.

Suitable diols ($u_1$) are all propanediols of the formula (I') in which either $R_1$ or $R_2$ or $R_1$ and $R_2$ is or are other than methyl, such as 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxyethyl-bicyclo[2.2.1]heptane, 2,2-diethyl-1,3-propanediol, 2,2-dipropyl-1,3-propanediol, 2-cyclohexyl-2-methyl-1,3-propanediol, et cetera.

Examples of diols ($u_2$) (formula (II')) that may be used include 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene, and 1,3-bis(2'-hydroxypropyl) benzene.

As diols ($u_1$) it is preferred to use 2-propyl-2-ethyl-1,3-propanediol, 2,2-diethyl-1,3-propanediol, 2-butyl-2-ethyl-1,3-propanediol, and 2-phenyl-2-ethyl-1,3-propanediol, and as component ($u_2$) it is preferred to use 2,3-dimethyl-2,3-butanediol and also 2,5-dimethyl-2,5-hexanediol. Particular preference is given to using 2-butyl-2-ethyl-1,3-propanediol and also 2-phenyl-2-ethyl-1,3-propanediol as component ($a_1$) and 2,5-dimethyl-2,5-hexanediol as component ($u_2$).

The diols ($u_1$) and/or ($u_2$) are commonly used in an amount of from 0.5 to 15% by weight, preferably from 1 to 7% by weight, based in each case on the overall weight of the synthesis components used to prepare the polyurethanes (A3).

Typical multifunctional isocyanates used to prepare the polyurethane resins are aliphatic, cycloaliphatic and/or aromatic polyisocyanates containing at least two isocyanate groups per molecule. Preference is given to the isomers or isomer mixtures of organic diiso- cyanates. Owing to their good stability to ultraviolet light, (cyclo)aliphatic diisocyanates give rise to products having only a low tendency to yellow. The polyisocyanate component used to form the prepolymer may also contain a fraction of polyisocyanates of higher functionality, provided that no gelling is caused as a result. Products which have become established as triisocyanates are those formed by trimerization or oligomerization of diisocyanates or by reaction of diisocyanates with polyfunctional compounds containing OH or NH groups. The average functionality may be lowered if desired by adding monoisocyanates.

Examples of polyisocyanates that may be used include phenylene diisocyanate, tolylene diisocyanate, xylylene diisocyanate, bisphenylene diisocyanate, naphthylene diisocyanate, diphenylmethane diisocyanate, isophorone diisocyanate, cyclobutane diisocyanate cyclopentylene diisocyanate, cyclohexylene diisocyanate, methylcyclohexylene diisocyanate, dicyclohexylmethane diisocyanate, ethylene diisocyanate, trimethylene diisocyanate, tetramethylene diisocyanate, pentamethylene diisocyanate, hexamethylene diisocyanate, propylene diisocyanate ethylethylene diisocyanate, and trimethylhexane diisocyanate.

To prepare high-solids polyurethane solutions, use is made in particular of diisocyanates of the general formula (III')

(III')

where X is a divalent aromatic hydrocarbon radical, preferably an unsubstituted or halogen-, methyl- or methoxy-substituted naphthylene, diphenylene or 1,2-, 1,3- or 1,4-phenylene radical, with particular preference for a 1,3-phenylene radical and $R_1$ and $R_2$ are an alkyl radical having 1–4 carbon atoms, preferably a methyl radical. Diisocyanates of the formula (III') are known (their preparation is described, for example, in EP-A-101 832, U.S. Pat. Nos. 3,290,350, 4,130,577, and 4,439,616) and some are available commercially (1,3-bis(2-isocyanatoprop-2-yl)benzene, for example, is sold by the American Cyanamid company under the tradename TMXDI (META)®).

Further preferred as polyisocyanate components are diisocyanates of the formula (IV'):

(IV')

where; R is a divalent alkyl or aralkyl radical having from 3 to 20 carbon atoms and R' is a divalent alkyl or aralkyl radical having from 1 to 20 carbon atoms;

especially 1-isocyanato-2-(3-isocyanatoprop-1-yl) cyclohexane.

Polyurethanes are generally incompatible with water unless specific constituents are incorporated and/or special preparation steps taken in the course of their synthesis. To prepare the polyurethane resins it is thus possible to use compounds which contain two H-active groups that are reactive with isocyanate groups, and at least one group which ensures dispersibility in water. Suitable groups of this kind are nonionic groups (e.g., polyethers), anionic groups, mixtures of these two groups, or cationic groups.

Accordingly it is possible to build into the polyurethane resin an acid number which is sufficiently large that the neutralized product can be dispersed safely in water. For this purpose use is made of compounds containing at least one isocyanate-reactive group and at least one group capable of forming anions. Suitable isocyanate-reactive groups are, in particular, hydroxyl groups and also primary and/or secondary amino groups. Groups capable of forming anions are carboxyl, sulfonic acid and/or phosphonic acid groups. It is preferred to use alkanoic acids having two substituents on the alpha carbon atom. The substituent may be a hydroxyl group, an alkyl group or am alkylol group. These polyols have at least one, generally from 1 to 3, carboxyl groups in the molecule. They have from 2 to about 25, preferably from 3 to 10 carbon atoms. The carboxyl-containing polyol may account for from 3 to 100% by weight, preferably from 5 to 50% by weight, of the overall polyol constituent in the NCO prepolymer.

The amount of ionizable carboxyl groups that is available by virtue of the carboxyl group neutralization in salt form is generally at least 0.4% by weight, preferably at least 0.7% by weight, based on the solids. The upper limit is approximately 12% by weight. The amount of dihydroxyalkanoic acids in the unneutralized prepolymer gives an acid number of at least 5 mg KOH/g, preferably at least 10 mg KOH/g. With very low acid numbers, it is generally necessary to take further measures to achieve dispersibility in water. The upper limit on the acid number is 150 mg KOH/g, preferably 40 mg KOH/g, based on the solids. The acid number is preferably situated within the range from 20 to 40 mg KOH/g.

The isocyanate groups of the isocyanato-containing prepolymer are reacted with a modifier. The modifier is preferably added in an amount such that instances of chain extension and thus of molecular weight increase occur. Modifiers used are preferably organic compounds containing hydroxyl and/or secondary and/or primary amino groups, especially polyols with a functionality of two, three and/or more, Examples of polyols which can be used include trimethylolpropane, 1,3,4-butanetriol, glycerol, erythritol, mesoerythritol, arabitol, adonitol, etc. Trimethylolpropane is used with preference.

To prepare the polyurethane resin of the invention it is preferred first to prepare an isocyanato-containing prepolymer from which the desired polyurethane resin is then prepared by further reaction, preferably chain extension The reaction of the components takes place in accordance with the well-known processes of organic chemistry (cf., e.g., Kunststoff-Handbuch, Volume 7: Polyurethane, edited by Dr. Y. Oertel, Carl Hanser Verlag, Munich, Vienna, 1983). Examples of the preparation of the prepolymers are described in DE-A 26 24 442 and DE-A 31 10 051. The polyurethane resins may be prepared by the known methods (eg., acetone method).

The components are preferably reacted in ethoxyethyl propionate (EEP) as solvent. The amount of EEP in this case may be variable within wide limits and should be sufficient for the formation of a prepolymer solution of appropriate viscosity. In general up to 70% by weight, preferably from 5 to 50% by weight, and with particular preference less than 20% by weight of solvent is u based on the solids. Accordingly, the reaction may be carried out with very particular preference for example, at a solvent content of 10–15% by weight EEP, based on the solids.

The reaction of the components may take place if desired in the presence of a catalyst, such as organotin compounds and/or tertiary amines.

To prepare the prepolymers, the amounts of the components are chosen such that the equivalents ratio of NCO groups to OH groups is situated between 2.0:1.0 and >1.0:1.0, Preferably between 1.4:1 and 1.1:1.

The NCO prepolymer contains at least about 0.5%t by weight of isocyanate groups, preferably at least 1% by weight of NCO, based on the solids. The upper limit is approximately 15% weight, preferably 10% by weight, with particular preference 5% by weight of NCO.

Suitable components (A4) are all water-dilutable binders that are compatible with the other constituents of component (I), examples of such binders being acrylated polyurethane resins and/or polyester acrylates.

In particular, the very particularly preferred component (I) comprises as binder (A)

(A1) at least 20% by weight of at least one polyacrylate resin (A1), (A2) from 0 to 30% by weight of at least one polyester (A2), (A3) from 0 to 80t by weight of at least one polyurethane resin (A3), and (A4) from 0 to 10% by weight of at least one further binder (A4), the sum of the weight fractions of components (A1) to (A4) being in each case 100% by weight.

Besides the functionalized alkanes that are important to the invention, and the binders (A), the component (I) may include as constituent (B) all customary coatings, pigments and/or fillers in fractions of from 0 to 60% by weight, based on component (I). In this context it is possible to use not only the pigments that are common in aqueous compositions and which do not react with water and/or do not dissolve in water, and the pigments commonly employed in conventional coating compositions. The pigments may comprise organic or inorganic compounds and may impart color and/or effect. The coating composition of the invention therefore ensures, owing to this large number of appropriate pigments, a universal scope for use, and permits the realization of a large number of shades.

As effect pigments it is possible to use metal flake pigments, such as commercially customary aluminum bronzes, aluminum bronzes chromated in accordance with DE-A-36 36 183, and commercially customary stainless steel bronzes, and also nonmetallic effect pigments, such as pearlescent pigments and interference pigments for example. Examples of suitable inorganic color pigments are titanium dioxides, iron oxides, Sicotrans yellow, and carbon black. Examples of suitable organic color pigments are indanthrene blue, Cromophthal red, Irgazine orange and Heliogen green. Examples of suitable fillers are chalk, calcium sulfates, barium sulfate, silicates such as talc or kaolin, silicas, oxides such as aluminum hydroxide or magnesium hydroxide, nanoparticles or organic fillers such as textile fibers, cellulose fibers, polyethylene fibers or wood flour.

As a further constituent (C) the component (I) may include at least one organic solvent which may be diluted with water. Such solvents may also participate in the reaction with the crosslinking component (II) and may therefore act as reactive diluents.

Examples of suitable solvents are the compounds already specified in the context of the preparation of the polyacrylate resins (A1) (see above). Also suitable are esters, ketones, keto esters, glycol ethers such as ethylene, propylene or butylene glycol ethers, glycol esters such as ethylene, propylene or butylene glycol esters, or glycol ether esters such as ethoxyethyl propionate and isopropoxypropanol. Further suitable solvents include aliphatic and aromatic solvents such as dipentene, xylene or Shellsol®.

The solvents (C) may further consist in whole or in part of low molecular weight oligomeric compounds, which may be unreactive or else reactive toward the crosslinking component (II). Where they are reactive, they comprise reactive diluents.

Examples of suitable reactive diluents are described above.

As constituent (D) the component (I) comprises, if desired, at least one neutralizing agent.

Examples of suitable neutralizing agents for functional groups (i) which can be converted into cations are organic and inorganic acids such as sulfuric acid, hydrochloric acid, phosphoric acid, formic acid, acetic acid, lactic acid, dimethylolpropionic acid or citric acid.

Examples of suitable neutralizing agents for functional groups (ii) which can be converted into anions are ammonia, ammonium salts, such as ammonium carbonate or ammonium hydrogen carbonate, for example, and also amines, such as trimethylamine, triethylamine, tributylamine, dimethylaniline, diethylaniline, triphenylamine, dimethylethanolamine, diethylethanolamine, methyldiethanolamine, triethanolamine, and the like. Neutralization may be effected in organic phase or in aqueous phase. Dimethylethanolamine is a preferred neutralizing agent used.

The amount of neutralizing agent (D) used in total in the coating composition of the invention is chosen such that from 1 to 100 equivalents, preferably from 50 to 90 equivalents, of the functional groups (i) or (ii) of the binder (A) are neutralized. The neutralizing agent (D) may be added to component (I), (II) and/or (III). Preferably, however, the neutralizing agent (D) is added to component (III).

As constituent (E) the component (I) may comprise at least one rheology control additive. Examples of suitable rheology control additives are those known from the patents WO 94/22968, EP-A-0 276 501, EP-A-0 249 201, and WO 97/12945; crosslinked polymeric microparticles, as disclosed for example in EP-A-0 008 127; inorganic phyllosilicates such as aluminum magnesium silicates, sodium magnesium phyllosilicates, and sodium magnesium fluorine lithium phyllosilicates of the montmorillonite type; silicas such as Aerosils; or synthetic polymers containing ionic and/or associative groups, such as polyvinyl alcohol, poly(meth)acrylamide, poly(meth)acrylic acid, polyvinylpyrrolidone, styrene-maleic anhydride or ethylene maleic anhydride copolymers and their derivatives, or hydrophobically modified ethoxylated urethanes or polyacrylates. Preferred rheology control additives used are polyurethanes.

The component (I) may further comprise at least one additional customary coatings additive (E). Examples of such additives are defoamers, dispersing auxiliaries, emulsifiers, and leveling agents.

Of course, said additives (E) may also be added separately to the coating composition. In this case the additives (E) are then referred to as component (IV).

To prepare the coating compositions of the invention it is preferred to use components (I) which consist of from 20 to 90% by weight, preferably from 35 to 80% by weight, of the binder (A), especially the polymeric or oligomeric resins (A1), (A2), (A3), and/or (A4), from 1 to 80% by weight, preferably from 5 to 50% by weight, based on the total amount of binder (A) and functionalized alkane, of at least one functionalized alkane, from 0 to 60% by weight of at least one pigment and/or filler (B), from 0 to 50% by weight, preferably from 10 to 40% by weight, of at least one organic, optionally water-dilutable solvent (C), from 0 to 20i by weight, preferably from 0.1 to 10% by weight, of at least one neutralizing agent (D), and from 0 to 20% by weight, preferably from 2 to 10% by weight, of at least one customary auxiliary and/or additive (coatings additive) (E), the sum of the weight fractions of all constituents being in each case 100% by weight.

The further key constituent of the coating composition of the invention is at least one crosslinking agent (F) which is present in component (II).

The crosslinking agents (F) comprise at least one diisocyanate and/or polyisocyanate (F) which if desired is dispersed or dissolved in one or more organic, optionally water dilutable solvents.

The polyisocyanate component (F) comprises organic polyisocyanates, especially those known as paint polyisocyanates, containing free isocyanate groups attached to aliphatic, cycloaliphatic, araliphatic and/or aromatic moieties. Preference is given to using polyisocyanate5 containing from 2 to 5 isocyanate groups per molecule and having viscosities of from 100 to 10 000, preferably from 100 to 5 000, and, where manual mixing of the components (I), (II) and (III) is envisaged—in particular from 1 000 to 2 000 mPas (at 23° C.). If desired, small amounts of organic solvent may be added to the polyisocyanates, preferably from 1 to 25% by weight based on straight polyisocyanate, in order thus to improve the ease of incorporation of the isocyanate and, where appropriate, to lower the viscosity of the polyisocyanate to a level within the aforementioned ranges. Examples of suitable solvent additives for the polyisocyanates are ethoxyethyl propionate, amyl methyl ketone, and butyl acetate. Furthermore, the polyisocyanates may have been conventionally hydrophilically or hydrophobically modified.

Examples of suitable isocyanates are described by way of example in "Methoden der organischen Chemie", Houben-Weyl, Volume 14/2, 4th edition, Georg Thieme Verlag, Stuttgart 1963, pages 61 to 70, and by W. Siefken, Liebigs Annalen der Chemie, Volume 562, pages 75 to 136. Suitable examples include the isocyanates specified in the context of the description of the polyurethane resins (A3), and/or isocyanato-containing polyurethane prepolymers which may be prepared by reacting polyols with an excess of polyisocyanates and which are preferably of low viscosity.

Further examples of suitable polyisocyanates are isocyanato-containing polyurethane prepolymers which can be prepared by reacting polyols with an excess of polyisocyanates and are preferably of low viscosity. It is also possible to use isocyanates containing isocyanurate, biuret, allophanate, iminooxadiazindione, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyante, 2-isocyanatopropylcyclohexyl isocyanate, dicyclohexylmethane 2,40-diisocyanate, dicyclohexylmethane 4,4'-diisocyanate or 1,3-bis-(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanato-methylheptane or 1-isocyanato-2-(3-isocyanatopropyl)-cyclohexane, or mixtures of these polyisocyanates.

Very particular preference is given to using mixtures of polyisocyanates containing uretdione and/or isocyanurate and/or allophanate groups and based on hexamethylene diisocyanate, as formed by catalytic oligomerization of hexamethylene diisocyanate using appropriate catalysts. The polyisocyanate constituent may further comprise any desired mixtures of the free polyisocyanates exemplified.

The coating composition of the invention may further comprise isocyanato-free crosslinking agents (F'). Depending on their reactivity, these may be present in components (I), (II) and/or (III); the critical factor is that the crosslinking agents (F') do not adversely affect the storage stability of the component in question, such as by premature crosslinking.

The skilled worker will therefore be able to select the appropriate combinations of crosslinking agents (F') on the one hand and components (I), (II) and/or (III) on the other in a simple manner.

Examples of suitable crosslinking agents (F') are blocked diisocyanates and/or polyisocyanates based on the aforementioned diisocyanates and/or polyisocyanates (F). Examples of suitable blocking agents are aliphatic, cycloaliphatic or araliphatic monoalcohols such as methyl, butyl, octyl or lauryl alcohol, cyclohexanol or phenylcarbinol; hydroxylamines such as ethanolamine; oximes such as methyl ethyl ketone oxime, acetone oxime or cyclohexanone oxime; amines such as dibutylamine or diisopropylamine; CH-acidic compounds such as malonic diesters or ethyl acetoacetate; heterocycles such as dimethylpyrazol; and/or lactams such as epsilon-caprolactam. These crosslinking agents (F') may be present in components (II) and/or (III).

Further examples of suitable crosslinkin agents (F') are polyepoxides (F'), especially all known aliphatic and/or cycloaliphatic and/or aromatic polyepoxides, based for example on bisphenol A or bisphenol F. Examples of suitable polyepoxides (F') also include the polyepoxides available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether), and Denacol EX-521 (polyglycerol polyglycidyl ether). These crosslinking agents (F') may be present in components (I) and/or (III).

As crosslinking agents (F') it is also possible to use tris(alkoxycarbonylamino)triazines of formula

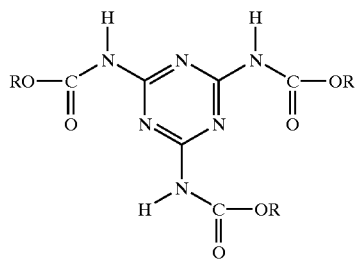

These crosslinking agents (F') my be present in components (I) and/or (III).

Examples of suitable tris(alkoxycarbonylamino)triazines (F') are described in the patents U.S. Pat. Nos. 4,939,213, 5,084,541, and EP-A-0 624 577. The tris(methoxy-, tris (butoxy- and/or tris(2-ethylhexoxycarbonylamino)-triazines are used in particular.

The methyl butyl mixed esters, the butyl 2-ethylhexyl mixed esters, and the butyl esters are of advantage. They have the advantage over the straight methyl ester of better solubility in polymer melts, and also have less of a tendency to crystallize.

In particular it is possible to use amino resins, examples being melamine resins, as crosslinking agents (F'). In this context it is possible to use any amino resins suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this type are described in the patents U.S. Pat. No. 4,710,542 and EP-B-0 245 700 and also in the article by B. Singh and coworkers, "Carbamylmethylated Melamines, Novel Crosslinkers for the Coatings Industry" in Advanced Organic Coatings Science and Technology Series, 1991, Volume 13, pages 193 to 207. These crosslinking agents (F') may be present in the components (I) and/or (III).

Further examples of suitable crosslinking agents (F') are beta-hydroxyalkylamides such as N,N,N',N'-tetrakis-(2-hydroxyethyl)adipamide or N,N,N',N'-tetrakis(2-hydroxypropyl)adipamide. These crosslinking agents (F') may be present in components (I) and/or (III).

Further examples of suitable crosslinking agents (F') are siloxanes, especially siloxanes containing at least one trialkoxy- or dialkoxysilane group- These crosslinking agents (F') may be present in components (I), (II) and/or (III).

The polyisocyanates (F) are used advantageously in an amount of at least 70% by weight, with particular preference in an amount of 80 to 100% by weight, based on the overall weight of the crosslinking agents (F) and (F') in the coating composition of the invention.

The constituents (G) and (H) of component (II) correspond to the constituents (C) and (E) of component (I), except that here constituents are used which do not react to isocyanate groups.

To prepare the coating compositions of the invention it is preferred to use components (II) which consist of (F) from 50 to 100% by weight, preferably from 60 to 90% by weight, of at least one crosslinking agent, (G) from 0 to 50% by weight, preferably from 10 to 40% by weight, of at least one organic, optionally water dilutable solvent, and (H) from 0 to 20% by weight, preferably from 0 to 10% by weight, of at least one customary auxiliary and/or additive, the sum of the weight fraction of components (F) to (H) being in each case 100% by weight.

The further key constituent of the coating composition of the invention is component (III).

In accordance with the invention, this component (III) consists of or comprises water. It is of advantage in accordance with the invention if the component (III) includes further suitable constituents in addition to water.

Examples of suitable constituents are the binders (A) described in detail above, especially the binders (A) containing (i) functional groups which can be converted into cations by neutralizing agents and/or quaternizing agents, and/or cationic groups, or (ii) functional groups which can be converted into anions by neutralizing agents, and/or anionic groups, and/or (iii) nonionic hydrophilic groups.

Of these, the binders (A1), (A2) and/or (A3) and, where appropriate, (A4) dispersed or dissolved in water are particularly advantageous and therefore used with particular preference.

Where component (I) includes binders (A) which are not, or not to any great extent, soluble or dispersible in water, it is advisable to use in particular the binders (A1), (A2) and/or (A3) that are dispersed or dissolved in water.

Alternatively, the binders (A) may be in the form of a powder slurry. In this case the further flame retardants (F') may be present in the powder slurry particles. Powder slurries are customary and known and are described, for example, in the patents EP-A-0 652 264, U.S. Pat. No. 4,268,542, DE-A-196 13 547, and DE-A-195 18 392.

The component (III) may further comprise at least one of the above-described reactive diluents.

For preparing the coating compositions of the invention it is very particularly preferred to use components (III) which consist of

- (J) from 40 to 90% by weight, preferably from 50 to 85% by weight, of water,
- (K) from 5 to 50% by weight, preferably from 10 to 45% by weight, of the binder (A), especially the polymeric or oligomeric resins (A1), (A2) and/or (A3) and, where appropriate (A4), in a form dissolved or dispersed in water,
- (L) from 0 to 20% by weight, preferably 2 to 10% by weight, of at least one neutralizing agent, and
- (M) from 0 to 20% by weight, preferably from 2 to 10% by weight, of at least one customary auxiliary and/or additive (coatings additive), the sum of the weight fraction of components (L) to (M) being in each case 100% by weight.

The constituents (L) and (M) of component (III) correspond with the constituents (D) and (E) of component (I).

The component (III) consisting of the water-dispersed form of component (A) and therefore of the water-dispersed form of the binders (A1), (A2) and/or (A3) and, where appropriate, (A4) may on the one hand be prepared by preparing the components in organic solvents, then neutralizing the acid groups, especially carboxyl groups, with the neutralizing agent (L) and, finally, introducing the neutralized constituents into deionized water, or on the other hand may be prepared by emulsion polymerization of the monomeric building blocks of the binders (A) in water.

Preferably, the components (A1), (A2) and/or (A3) and, where appropriate, (A4) are first prepared in organic solvents, then neutralized and, finally, dispersed in water in neutralized form.

In the course of the preparation of the water-dispersed form of the polyacrylate resins (A1), the polymerization in the organic solvent is preferably conducted in a plurality of stages with separate monomer and initiator feeds. With very particular preference, the polyacrylate resin (A1) is prepared by the two-stage process already described above, by 1. polymerizing a mixture of (a1), (a2), (a4), (a5), and (a6), or a mixture of portions of components (a1), (a2), (a4), (a5), and (a6), in an organic solvent,
2. after at least 60% by weight of the mixture consisting of (a1), (a2), (a4), (a5), and, where used, (a6) have been added, adding (a3) and any remainder of components (a1), (a2), (a4), (a5), and (a6), and continuing polymerization, and
3. after the end of the polymerization, subjecting the resulting polyacrylate resin (A1) if desired to at least partial neutralization.

Examples of suitable neutralizing agents (L) as used in step 3 are the ammonia, ammonium salts and amines (constituent (D) of component (I)) already described in connection with the preparation of component (I), it being possible for the neutralization to take place in organic phase or in aqueous phase. The total amount of neutralizing agent (L) used to neutralize the component (A1) is chosen so that from 1 to 100 equivalents, preferably from 50 to 90 equivalents, of the acid groups of the binder (A1) are neutralized.

Used as preference as constituents (A2) in component (III) are polyesters (A2) prepared by a two-stage process comprising first preparing a hydroxyl-containing polyester having an OH number from 100 to 300 mg KOH/g, an acid number of less than 10 mg KOH/g, and a number average molecular weight Mn of from 500 to 2 000 daltons, which is then reacted in a second stage with carboxylic anhydrides to give the desired polyester (A2) The amount of carboxylic anhydrides is chosen such that the resulting polyester has the desired acid number.

After the end of the reaction the polyester (A2) is subjected to at least partial neutralization, in which case it is again possible to use the neutralizing agent (L) (constituent (D) of component (I)) already described in connection with the preparation of component (I) and for the neutralization to take place in organic phase or in aqueous phase.

To prepare the polyurethane resins (A3) for component (III) it is preferred first to prepare an isocyanato-containing prepolymer from which the polyurethane resin (A3) is then prepared by further reaction, preferably by chain extension.

After the end of the polymerization the resulting polyurethane resin is subjected to at least partial neutralization, in which case it is again possible to use the neutralizing agent (L) (constituent (D) of component (I)) already described in connection with the preparation of component (I) and for the neutralization to take place in organic phase or in aqueous phase.

Suitable components (A4) which are additionally present where appropriate are all water dilutable and/or water dispersible binders that are compatible with the other constituents of component (III), examples of such binders including acrylated polyurethane resins and/or polyester acrylates.

To prepare the coating compositions, components (I), (II) and (III) are used preferably in amounts such that the equivalents ratio of hydroxyl groups of the binders (A) and of the functionalized alkanes to be used according to the invention and of the reactive diluents, where appropriate, to the crosslinking groups of the crosslinking agent (F) and also, where appropriate, (F') is situated between 1:2 and 2:1, preferably between 1:1.2 and 1:1.5.

Furthermore, the coating compositions of the invention preferably comprise in total from 10 to 60% by weight, preferably from 15 to 50% by weight, of functionalized alkanes that are important to the invention, from 15 to 60% by weight, preferably from 20 to 50% by weight, of binders (A), from 5 to 30% by weight, preferably from 10 to 20% by weight, of crosslinking agents (F), from 5 to 25% by weight, preferably from 10 to 20% by weight, of organic solvents (C), from 25 to 60% by weight, preferably from 30 to 50% by weight, of water, from 0 to 50% by weight, preferably from 0 to 30% by weight, of pigments and/or fillers (B), and from 0 to 10% by weight of customary coating additives (E), based in each case on the overall weight of the coating composition of the invention.

The preparation of component (I) takes place in accordance with methods known to the skilled worker by mixing and, where appropriate, dispersing of the individual constituents. For example, color pigments (B) are normally incorporated by grinding (dispersing) the respective pigments in one or more binders. The dispersing of the pigments takes place with the aid of customary apparatus, such as bead mills and sand mills, for example.

Components (II), (III) and, where appropriate, (IV) are likewise prepared in accordance with methods well known to the skilled worker, by mixing and/or dispersing the individual constituents.

The coating compositions of the invention are prepared in particular by the following mixing method from components (I), (II), (III) and, where appropriate, (IV):

To prepare the coating compositions of the invention, first of all components (I) and (II) are mixed, these components (I) and (II) preferably containing no neutralizing agent Then component (IV), where appropriate, is added to this mixture. Then either the resulting mixture is added to component (III) comprising neutralizing agent (L) and the resulting coating composition is dispersed, or component (III) comprising neutralizing agent (L) is added to the resulting mixture.

Furthermore, the coating composition of the invention may be prepared in analogy to the process just described, in which case, however, the neutralizing agent (L) is not present in component (III) but is instead added separately prior to the addition of component (III).

Furthermore, the coating composition of the invention may also be prepared by first adding the neutralizing agent (L) to component (I). Instead of this mixture it is of course also possible to use a component (I) which already contains the neutralizing agent (L). The resulting component (I) is then mixed with component (II) and, where appropriate, with component (IV) (simultaneous or successive mixing with (II) and, where appropriate (IV)), then either the resulting mixture is added to component (III) or component (III) is added to it, and the coating composition thus obtained in each case is homogenized by dispersing.

If binders (A) containing exclusively nonionic hydrophilic groups (iii) are used, the use of the neutralizing agent (L) is omitted.

The coating compositions of the invention may be applied to any desired substrates, such as metal, wood, plastic, glass or paper, for example, by customary application methods, such as spraying, knife coating, brushing, flow coating, dipping or rolling, for example When used in automotive refinish, the coating compositions of the invention are normally cured at temperatures of below 120° C., preferably at temperatures of not more than 80° C. When used in automotive OEM finishing, higher curing temperatures as well are employed.

The coating compositions of the invention are preferably used to produce topcoats. The coating compositions of the invention may be used both in the OEM finishing and in the refinish of automobile bodies. However, they are preferably used in the area of the refinish and finishing of plastics parts.

The aqueous coating compositions of the invention may be used as power-surfacers and also to produce single-coat topcoats, and also as pigmented basecoat materials or as clearcoat materials in a process for producing a multicoat system (basecoat-clearcoat process).

EXAMPLES

Comparative Experiment C1

Preparation Example 1
The Preparation of a Polyacrylate Resin (A1-1)

25 kg of ethoxyethyl propionate (EEP) were weighed into a 100 kilogram steel reactor suitable for polymerization and equipped with monomer feed, initiator feed, temperature measurement means, oil heating and reflux condenser, and were heated to 130° C. A mixture of 7.13 kg of butyl methacrylate, 5.72 kg of methyl methacrylate, 5.96 kg of styrene, 3.16 kg of lauryl methacrylate and 6.76 kg of hydroxyethyl acrylate was metered in at a uniform rate with stirring over the course of four hours. The initiator feed was started five minutes before this feed. The initiator solution (2.74 kg of tert-butyl peroxyethylhexanoate in 4.48 kg of EEP) was metered in at a uniform rate over 4.5 hours. After 2.5 hours of the metering time of the first monomer feed, the second monomer feed was started. It consisted of 2.8 kg of hydroxyethyl acrylate, 1.36 kg of acrylic acid and 0.68 kg of EEP and was metered in at a uniform rate over 1.5 hours.

This gave the polyacrylate resin (A1-1) having a solids content of 79.2% (one hour; 130° C.), an acid number of 31.1 mg KOH/g and a viscosity of 4.4 dPas (55% in EEP).

Preparation Example 2
The Preparation of a Polyester Resin Precursor

A 4 liter steel reactor suitable for polycondensation reactions was charged with 1 088 g of neopentyl glycol hydroxypivalate, 120 g of phthalic anhydride, 1 268 g of isophthalic acid, 21 g of butylethylpropanediol, 489 g of neopentyl glycol and 113 g of xylene. This initial charge was then heated and the water of condensation was removed continuously until an acid number of 3.5 mg KOH/g was reached. Thereafter a solids content of 79.7% was set using EEP. The acid number of the resulting polyester resin (A2) was 4.4 mg KOH/g, its viscosity 3.6 dPas (60% in EEP).

Preparation Example 3
The Preparation of a Water-dispersed Polyurethane Resin (A3) for Use in Accordance with the Invention A 4 liter steel reactor suitable for polyurethane resin synthesis was charged with 749 g of the polyester resin precursor from Preparation Example 2, 6.6 g of ethylbutylpropanediol, 69 g of dimethylolpropionic acid and 318 g of m-tetramethylxylylene diisocyanate and this initial charge was left to react at a product temperature of 110° C. until a constant isocyanate content was reached. Then 101 g of trimethylolpropane were added in one portion and heating was continued until the reaction was ended. Subsequently 31.5 g of EEP were added. After stirring for 30 minutes, the product was neutralized with 36.7 g of dimethylethanolamine. The resultant polyurethane resin (A3) was dispersed at from 90 to 110° C. in 1 929.2 g of water whose temperature was 60° C. The resultant dispersion was free from gel particles, was homogeneous, and had a solids content of 36.1%, an acid number of 30.3 mg KOH/g, and a pH of 7.1. The dispersions were stable on storage at 40° C. for longer than four weeks.

Preparation Example 4
The Preparation of a Water-dispersed Polyacrylate Resin (A1-2) for Use in Accordance with the Invention The polyacrylate resin was prepared in a 4 liter steel rector with stirrer, reflux condenser, 2 monomer feeds and one initiator feed. 385 g of n-butanol were introduced as initial charge and heated to 110° C. Over the course of five hours, a mixture of 255 g of butyl methacrylate, 197 g of methyl methacrylate, 181 g of styrene, 113 g of Methacrylester 13 (methacrylic alkyl ester from Rohm & Haas) and 215 g of hydroxyethyl acrylate was metered in. After 3.5 hours of the first monomer feed, a second monomer feed comprising 113 g of hydroxyethyl methacrylate and 58 g of acrylic acid was started and was metered in at a uniform rate over the course of 1.5 hours. Subsequently, polymerization was continued for two hours. Following neutralization with 63 g of dimethylethanolamine, the product was stirred for a further 30 minutes. The resultant neutralized polyacrylate resin (A1-2) was dispersed in 1 338 g of deinoized water. The organic solvent was distilled off in vacuo to a residual content <1.5%. After the solids content had been adjusted to 39.9% using deionized water, the resultant dispersion was characterized. Its pH was 7.2, its acid number 41.4 mg KOH/g. It exhibited pseudoplasticity and was stable on storage at 40° C. for more than four weeks.

Example 1

Preparation of an Inventive Coating Composition 1.1 The Preparation of Component (I)

Component (I) was prepared by mixing the following constituents with one another using a stirrer (600 rpm):

- 70.48 parts by weight of the polyacrylate resin (A1-1) from Preparation Example 1,
- 11.36 parts by weight of 2,4-diethyl-1,5-octanediol
- 4.24 parts by weight of dibasic ester (DBE: mixture of dimethyl adipate, glutarate and succinate from DuPont),
- 12.76 parts by weight of butyl glycol acetate,
- 4.24 parts by weight of a commercial wetting agent (Tensid S from Biesterfeld),
- 0.88 part by weight of a leveling agent based on a polyether-modified dimethylsiloxane copolymer (Byk® 333 from Byk Gulden),
- 0.88 part by weight of a commercial silicone additive (Tego Glide® 410 from Tego Chemie),
- 2.52 parts by weight of a fluorine-containing leveling agent (Fluorad® FL 430, 10% in butyl glycol acetate, from 3 M).
- 1.76 parts by weight of a commercial light stabilizer (Tinuvin® 292 from Ciba),
- 1.28 parts by weight of a further commercial light stabilizer (Tinuvin® 1130 from Ciba).

1.2 The Preparation of component (II)

Component (II) was prepared by mixing 74.6 parts by weight of Desmodur® 2025/1 (polyisocyanate of the hexamethylene diisocyanate type having an isocyanate content of 23%, from Bayer) and 6.44 parts by weight of butyl glycol acetate with one another.

1.3 The Preparation of Component (III)

Component (III) was prepared by mixing 72.48 parts by weight of deionized water, 1.76 parts by weight of dimethylethanolamine, 44.8 parts by weight of a polyacrylate resin dispersion (A1-2) from Preparation Example 4, and 89.52 parts by weight of a polyurethane resin dispersion (A3) from Preparation Example 3 with one another.

1.4 The Preparation of an Inventive Clearcoat Material

The inventive clearcoat material was prepared by mixing the above-described components (I), (II) and (III) with one another and with stirring. The resultant clearcoat material had a viscosity of 73 s (DIN 4 cup); for application, it was adjusted to 35 s by adding 15.4 parts by weight of water.

1.5 The Production of Inventive Coatings and Test Panels

Steel panels which had been coated conventionally with an electrodeposition coating material and a primer-surfacer were coated with a black basecoat material in a thickness of from 12 to 15 micrometers. The basecoat was dried at 80° C. for ten minutes. Subsequently the inventive clearcoat material was applied at different film thicknesses.

In the case of Example 1.5a, the steel panels were dried at room temperature for 15 minutes and at 80° C. for 10 minutes and then baked at 140° C.

In the case of Example 1.5b, the steel panels were dried at room temperature for 15 minutes and at 80° C. for 45 minutes.

In both cases the popping limit was about 60 micrometers; only a few fine pinholes occurred.

The gloss at 20° in accordance with DIN 67530 was found to be 84.1 in the case of Example 1.5a and 80.5 in the case of Example 1.5b.

The gray haze was measured using the Microglass Haze hazemeter from Byk-Gardner; in both examples the figure was below 20.

The gasoline resistance was tested as follows; the painted test panels were dried in air at 23° C. for 24 hours. Subsequently, filter pads with a diameter of 2.3 cm were placed on the test panels. Using a pipette, 0.75 ml of supergrade gasoline (no older than four weeks) were trickled onto the filter pads, which were immediately thereafter weighted with 100 g weights. After five minutes, the weights and the filter pads were removed again The excess gasoline was removed and the sites of action were immediately examined for marks. In both examples 1.5a and 1.5b, no marks could be seen.

Comparative Experiment V1

Preparation of a Noninventive Coating Composition

To prepare the noninventive coating composition, components (I), (II) and (III) were chosen in respect of their composition and their proportion to one another such that the resultant coating composition (unadjusted to spray viscosity) had a solids/solvent ratio of 79:21, which corresponded to that of Example 1. Furthermore, comparable proportions of additive to binder amounts were formulated for Comparative Experiment C1 and for Example 1.

C1.1 The Preparation of Component (I)

To prepare component (I), the following constituents were mixed wits one another using a stirrer (600 rpm):

- 59.4 parts by 4eight of polyacrylate resin (A1-1) from Preparation Example 1,
- 3.57 parts by weight of Dibasic Ester (DBE; mixture of dimethyl adipate, glutarate and succinate from DuPont)
- 5.13 parts by weight of butyl glycol acetate,
- 3.57 parts by weight of a commercial wetting agent (Tensid S from Biesterfeld),
- 0.72 part by tonight of a leveling agent based on a polyether-modified dimethylsiloxane copolymer (Byk® 333 from Byk Gulden,
- 0.72 part by weight of a commercial silicone additive (Tego Glide® 410 from Tego Chemie),
- 2.16 parts by weight of a fluorine-containing leveling agent (Fluorad® FL 430, 10% in butyl glycol acetate, from 3 M),
- 1.44 parts by weight of a commercial light stabilizer (Tinuvin® 292 from Ciba), and
- 1.08 parts by weight of a further commercial light stabilizer (Tinuvin® 1130 from Ciba)

C1.2 The Preparation of Component (II)

To prepare component (II), 43.35 parts by weight of DesmodurR 2025/1 (hexamethylene diisocyanate-type polyisocyanate having an isocyanate content of 23%, from Bayer) and 3.12 parts by weight of butyl glycol acetate were mixed with one another.

C1.3 The Preparation of Component (III)

To prepare component(III), 61.05 parts by weight of deionized water, 1.44 parts by weight of dimethylethanolamine, 37.8 parts by weight of the polyacrylate resin dispersion (A1-2) from Preparation Example 4 and 75.45 parts by weight of the polyurethane resin dispersion (A3) from Preparation example 3 were mixed with one another.

C1.4 The preparation of a Noninventive Clearcoat Material

To prepare the noninventive clearcoat material, the above-described components (I), (II) and (III) were mixed with one another by stirring. The resultant clearcoat material had a viscosity of 53 s (DIN 4-cup); for application it was adjusted to 35 s by adding 6.2 parts by weight of water.

C1.5 The Production of Noninventive Coatings and Test Panels

Steel panels which had been coated in a customary and known manner with an electrodeposition coating material and with a primer-surface layer were coated with a black basecoat material in a thickness of from 12 to 15 micrometers. The basecoat was dried initially at 80° C. for 10 minutes. Thereafter the noninventive clearcoat material was applied in different film thicknesses.

In the case of Comparative Experiment C1.5a, the steel panels were dried at room temperature for 15 minutes and at 80° C. for 10 minutes and then baked at 140° C.

In the case of Comparative Experiment C1.5b, the steel panels were dried at room temperature for 15 minutes and at 80° C. for 45 minutes.

In both cases the popping limit was only about 45 micrometers.

The gloss at 20 degrees in accordance with DIN 67530 was found to be 83.3 in the case of Comparative Experiment C1.5a and 84 in the case of Comparative Experiment C1.5b.

The gray haze was measured using a Microglass Haze hazemeter from Byk-Gardner; in the case of Comparative Experiment C1.5a the figure was 36.8 in the case of Comparative Experiment C1.5b 40.2.

The gasoline resistance was tested as for Example 1. With both comparative experiments C1.5a and C1.5b, marks could be seen The comparison of the example with the comparative experiment demonstrates the advantageous nature of the coating composition of the invention.

What is claimed is:

1. A coating composition comprising at least three components, comprising
   (I) a component comprising at least one oligomeric or polymeric resin containing functional groups which react with isocyanate groups, as binder (A),
   (II) a component comprising at least one polyisocyanate as crosslinking agent (F), and
   (III) a component selected from the group consisting of water and a mixture of water and at least one binder (A),
   wherein at least one of components (I) and (III) comprise at least one branched alkane, selected from the group consisting of cyclic and acyclic $C_9$–$C_{16}$-alkanes functionalized using at least two hydroxyl groups.

2. The coating composition as claimed in claim 1, wherein the functionalized alkane is liquid at room temperature.

3. The coating composition as claimed in claim 1, wherein the functionalized alkane has a boiling point of more than 200° C.

4. The coating composition as claimed in claim 1, wherein the functionalized alkane is acyclic.

5. The coating composition as claimed in claim 1, wherein the functionalized alkane has functional groups selected from primary and secondary, hydroxyl groups and mixtures thereof.

6. The coating composition as claimed in claim 1, wherein the functionalized alkane comprises a polyol.

7. The coating composition as claimed in claim 6, wherein the functionalized alkanles are selected from the group consisting of diols, triols and mixtures thereof.

8. The coating composition as claimed in claim 7, wherein the diols are isomeric dialkyloctenediols.

9. The coating composition as claimed in claim 8, wherein the diol comprises 2,4-diethyl-1,5-octanediol.

10. The coating composition as claimed in claim 1, wherein the functional groups that react with isocyanate groups comprise hydroxyl groups.

11. The coating composition as claimed in claim 10, wherein component (I) comprises at least one water soluble or dispersible binder (A).

12. The coating composition as claimed in claim 11, wherein the binders (A) comprise functional groups selected from the group consisting of
   (i) functional groups which may be converted into cations by neutralizing agents, quaternizing agents, and cationic groups and mixtures thereof,
   (II) functional groups selected from groups which can be converted into anions by neutralizing agents, and anionic groups, and
   (iii) nonionic hydrophilic groups.

13. The coating composition claimed in claim 12, wherein the binders (A) contain groups selected from carboxylic acid, carboxylate groups (ii) and mixtures thereof.

14. The coating composition as claimed in claim 1, wherein at least some of the binders (A) in component (III) are in powder slurry particles.

15. The coating composition as claimed in claim 13, wherein component (I) comprises binder (A) selected from the group consisting of
   (A1) at least one acrylate copolymer (A1) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons an OH number of from 40 to 200 mg KOH/g, and an acid number of from 5 to 150 mg KOH/g
   (A2) at least one polyester resin (A2) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons, an OH number of from 30 to 250 mg KOH/g, and an acid number of from 5 to 150 mg KOH/g, and/or
   (A3) at least one polyurethane resin (A3) which is dispersible or soluble in one or more organic solvents, and contains functional groups selected from the group consisting of hydroxyl, carboxylic acids and carboxylate groups, and mixtures thereof, and has a number average molecular weight Mn of between 1 000 and 30 000 daltons, an OH number of from 20 to 200 mg KOH/g, and an acid number of from 5 to 150 mg KOH/g.

16. The coating composition as claimed in claim 1, further comprising a crosslinking agent (F') comprising at least one compound selected from the group consisting of epoxide compounds containing at least two epoxide groups per molecule, amino resins, blocked polyisocyanates, tris (alkoxycarbonylamino)triazines, siloxane and beta-hydroxyalkylamide, and mixtures thereof.

17. The coating composition as claimed in claim 1, wherein the functionalized alkane in component (I) and/or (III) is present in an amount of from 1 to 80% by weight, based in each case on the overall amount of binder (A) and functionalized alkanes.

18. The coating composition as claimed in claim 10, wherein component component (III) comprises at least one binder (A) dispersed or dissolved in water.

19. The coating composition as claimed in claim 10, wherein component (I) comprises at least one water soluble or dispersible binder (A) and component (III) comprises at least one binder (A) dispersed or dissolved in water.

20. The coating composition as claimed in claim 13, wherein component (III) comprises binder (A) selected from the group consisting of (A1) at least one acrylate copolymer (A1) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons an OH number of from 40 to 200 mg KOH/g, and an acid number of from 5 to 150 mg KOH/g (A2) at least one polyester resin (A2) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons, an OH number of from 30 to 250 mg KOH/g, and an acid number of from 5 to 150 mg KOH/g, and/or (A3) at least one polyurethane resin (A3) which is dispersible or soluble in one or more organics optionally water dilatable solvents, contains hydroxyl groups and carboxylic acid and/or carboxylate groups, and has a number average molecular weight Mn of between 1 000 and 30 000 daltons, an OH number of from 20 to 200 mg KOH/g, and an acid number of from 5 to 150 mg KOH/g.

21. The coating composition as claimed in claim 13, wherein components (I) and (III) comprise binder (A) selected from the group consisting of (A1) at least one acrylate copolymer (A1) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons an OH number of from 40 to 200 mg KOH/g, and an acid number of from 5 to 150 mg KOH/g (A2) at least one polyester resin (A2) which is dispersible or soluble in one or more organic solvents, and contains functional groups selected from the group consisting of hydroxyl, carboxylic acid and carboxylate groups and mixtures thereof, and has a number average molecular weight Mn of between 1 000 and 30 000 daltons, an OH number of from 30 to 250 mg KOH/g, and an acid number of from 5 to 150 mg KOH/g, and/or (A3) at least one polyurethane resin (A3) which is dispersible or soluble in one or more organics optionally water dilatable solvents, contains hydroxyl groups and carboxylic acid and/or carboxylate groups, and has a number average molecular weight Mn of between 1 000 and 30 000 daltons, an OH number of from 20 to 200 mg KOH/g, and an acid number of from 5 to 150 mg KOH/g.

22. The coating composition as claimed in claim 1, wherein the functionalized alkane in component (I) is present in an amount of from 5 to 50% by weight, based in each case on the overall amount of binder (A) and functionalized alkanes.

23. The coating composition as claimed in claim 1, wherein the functionalized alkane in component (I) is present in an amount of from 10 to 35% by weight, based in each case on the overall amount of binder (A) and functionalized alkanes.

24. The coating composition as claimed in claim 1, wherein the functionalized alkane in component (III) is present in an amount of from 1 to 80% by weight, based in each case on the overall amount of binder (A) and functionalized alkanes.

25. The coating composition as claimed in claim 1, wherein the functionalized alkane in component (III) is present in an amount of from 5 to 50% by weight, based in each case on the overall amount of binder (A) and functionalized alkanes.

26. The coating composition as claimed in claim 1, wherein the functionalized alkane in component (III) is present in an amount of from 10 to 35% by weight, based in each case on the overall amount of binder (A) and functionalized alkanes.

27. The coating composition as claimed in claim 1, wherein the functionalized alkane in component (I) and (III) is present in an amount of from 1 to 80% by weight, based in each case on the overall amount of binder (A) and functionalized alkanes.

28. The coating composition as claimed in claim 10, wherein component (III) comprises at least one binder (A) dispersed or dissolved in water.

29. The coating composition as claimed in claim 10, wherein component (I) comprises at least one water soluble or dispersible binder (A) and component (III) comprises at least one binder (A) dispersed or dissolved in water.

30. The coating composition as claimed in claim 1, wherein the functionalized alkane in component (I) is present in an amount of from 5 to 50% by weight, based in each case on the overall amount of binder (A) and functionalized alkanes.

31. The coating composition as claimed in claim 1, wherein the functionalized alkane in component (I) is present in an amount of from 10 to 35% by weight, based in each case on the overall amount of binder (A) and functionalized alkanes.

32. The coating composition as claimed in claim 1, wherein the functionalized alkane in component (III) is present in an amount of from 1 to 80% by weight, based in each case on the overall amount of binder (A) and functionalized alkanes.

33. The coating composition as claimed in claim 1, wherein the functionalized alkane in component (III) is present in an amount of from 5 to 50% by weight, based in each case on the overall amount of binder (A) and functionalized alkanes.

34. The coating composition as claimed in claim 1, wherein the functionalized alkane in component (I) is present in an amount of from 10 to 35% by weight, based in each case on the overall amount of binder (A) and functionalized alkanes.

35. The coating composition as claimed in claim 1, wherein the functionalized alkane in components (I) and (III) is present in an amount of from 1 to 80% by weight, based in each case on the overall amount of binder (A) and functionalized alkanes.

36. The coating composition as claimed in claim 1, wherein the functionalized alkane in components (I) and (III) is present in an amount of from 5 to 50% by weight, based in each case on the overall amount of binder (A) and functionalized alkanes.

37. The coating composition as claimed in claim 1, wherein the functionalized alkane in components (I) and (III) is present in an amount of from 10 to 35% by weight, based in each case on the overall amount of binder (A) and functionalized alkanes.

38. A coating composition as claimed in claim 1, comprising a coating selected from the group consisting of automotive OEM coatings, refinish coatings, automotive refinish coatings, and plastics coatings, topcoatings and primer-surfacer coatings.

* * * * *